(12) United States Patent
Nakazawa

(10) Patent No.: US 7,370,878 B2
(45) Date of Patent: May 13, 2008

(54) STRUCTURE FOR ATTACHING A FABRIC SHEET TO A VEHICLE BODY

(75) Inventor: Wataru Nakazawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/064,494

(22) Filed: Jul. 22, 2002

(65) Prior Publication Data

US 2003/0015859 A1  Jan. 23, 2003

(30) Foreign Application Priority Data

Jul. 23, 2001  (JP)  ............................. 2001-221676

(51) Int. Cl.
    *B60R 21/16*  (2006.01)
(52) U.S. Cl. .................. 280/728.2; 16/2.1; 16/2.5; 280/730.2; 280/749
(58) Field of Classification Search ............ 280/728.2, 280/727, 730.2, 728.1, 749; 16/2.1, 2.5; 439/550, 557
    See application file for complete search history.

(56) References Cited

U.S. PATENT DOCUMENTS

| | | | | |
|---|---|---|---|---|
| 3,091,795 A | * | 6/1963 | Budwig ........................ 16/2.1 |
| 4,720,147 A | * | 1/1988 | Takada ........................ 297/472 |
| 4,988,119 A | * | 1/1991 | Hartmeyer ................ 280/728.2 |
| 5,195,857 A | * | 3/1993 | Hiramoto .................... 411/344 |
| 5,362,187 A | * | 11/1994 | Scalise ........................ 411/555 |
| 5,395,152 A | * | 3/1995 | Skornicka et al. .......... 296/124 |
| 5,456,488 A | * | 10/1995 | Bauer ...................... 280/728.1 |
| 5,564,739 A | * | 10/1996 | Davidson ..................... 280/736 |
| 5,677,027 A | * | 10/1997 | Masuda et al. .............. 428/96 |
| 5,775,859 A | * | 7/1998 | Anscher ....................... 411/38 |
| 6,039,340 A | * | 3/2000 | Fischer ..................... 280/728.2 |
| 6,070,902 A | | 6/2000 | Kowalski et al. |
| 6,279,941 B1 | | 8/2001 | Nakajima et al. |
| 6,328,513 B1 | * | 12/2001 | Niwa et al. .................. 411/339 |
| 6,343,904 B1 | * | 2/2002 | Wang ........................... 411/368 |
| 6,431,585 B1 | * | 8/2002 | Rickabus et al. ......... 280/728.3 |
| 6,450,529 B1 | * | 9/2002 | Kalandek et al. ......... 280/730.2 |
| 6,508,486 B1 | * | 1/2003 | Welch et al. ............. 280/730.2 |
| 6,540,251 B1 | * | 4/2003 | LeVey et al. ............. 280/728.2 |
| 6,616,178 B1 | * | 9/2003 | Nanbu ...................... 280/730.2 |

(Continued)

FOREIGN PATENT DOCUMENTS

EP  0 899 171 A1  3/1999

(Continued)

*Primary Examiner*—Eric Culbreth
(74) *Attorney, Agent, or Firm*—Foley & Lardner LLP

(57) ABSTRACT

A structure for attaching a fabric sheet to a vehicle body, wherein the fabric sheet may be prevented from being twisted together with the rotation of a threaded fastener such as a bolt during fixation of the fabric sheet to the vehicle body by the threaded fastener. A spacer which is generally cylindrical is fitted in a hole of a tab. The spacer comprises a cylindrical portion into which a bolt is inserted, and a pair of flanges radially overhanging from both axial ends of the cylindrical portion, respectively. The flanges, have an outer diameter which is sufficiently large in comparison to the inner diameter of the hole. The cylindrical portion is inserted into the hole. The head a of the bolt never touches the tab so that the tab is never twists together with the bolt when the bolt is screwed into the bolt hole.

13 Claims, 11 Drawing Sheets

U.S. PATENT DOCUMENTS 6,757,945 B2 * 7/2004 Shibuya et al. ............... 24/662

FOREIGN PATENT DOCUMENTS

| JP | 10-203288 | 8/1998 |
| JP | 11-129857 | 5/1999 |
| JP | 2000-25551 | 1/2000 |
| JP | 142302 A | 5/2000 |
| WO | WO 96/26087 | 8/1996 |

* cited by examiner

STRUCTURE FOR ATTACHING A FABRIC SHEET TO A VEHICLE BODY

BACKGROUND

The present invention relates to a structure for attaching a fabric sheet to a vehicle body. In particular, the fabric sheet may be an airbag for protection of a vehicle occupant's head in a vehicle such as an automobile.

PCT Publication No. WO96/26087 discloses an exemplary airbag for protection of an occupant's head. The airbag includes two sheets which are sewn together to form cells between the sheets. Gas is supplied into the cells from a gas generator, whereby the airbag is inflated on the side of the occupant's head. Though the airbag is disposed along the top edge of a door opening of the vehicle, WO96/26087 fails to disclose any information about attaching the airbag to a vehicle body.

One possible way for fastening the upper edge portion of the airbag to the vehicle body is screwing threaded fasteners such as bolts into bolt holes formed in the vehicle body through holes formed in the upper edge portion of the airbag with washers, if necessary. In this case, since the heads of the bolts or the washers are directly in contact with the airbag, the airbag may twist together with the rotation washers or bolts when they are rotated, thus shifting the position and attitude of the airbag from the attitude required by design.

SUMMARY OF THE INVENTION

It is an object of the present invention to provide a structure for attaching a fabric sheet, such as an airbag for protection of a vehicle occupant's head, to a vehicle body. According to an embodiment of the present invention, the fabric sheet may be prevented from being twisted when the threaded fasteners, such as bolts, are rotated during fixation of the fabric sheet to the vehicle body by the threaded fasteners.

According to an embodiment of the present invention, a structure for attaching a fabric sheet to a vehicle body is provided. The fabric sheet is attached to the vehicle body by screwing a threaded fastener, inserted in a hole of a fabric sheet, into a fastening hole formed in the vehicle body. In the embodiment of the present invention, a spacer having a cylindrical portion is inserted in the hole. The diameter of the cylindrical portion is smaller than the inner diameter of the hole and the threaded fastener is inserted in the cylindrical portion. One end of the spacer is in contact with the vehicle body and the other end of the spacer is provided with a flange having a diameter larger than the inner diameter of the hole.

In the structure for attaching a fabric sheet to a vehicle body as described above, a spacer is inserted in a hole of the fabric sheet and a threaded fastener is inserted in the spacer so that the threaded fastener is held in non-contact with the fabric sheet. Therefore, the fabric sheet is never twisted together with the rotation of the threaded fastener when the threaded fastener is screwed into the vehicle body.

In a preferred embodiment of the present invention, a flange for receiving an enlarged portion of the threaded fastener is integrally formed with the cylindrical portion. The integrally formed flange and cylindrical portion facilitates the operation of inserting the threaded fastener into the spacer and screwing the threaded fastener into the vehicle body.

According to another embodiment of the present invention, a structure for attaching a fabric sheet to a vehicle body includes a spacer having a spacer rear body in contact with the vehicle body and a spacer front body connected with the spacer rear body. The spacer front body is provided with the flange, and the spacer rear body has an enlarged portion larger than the hole which is located on the vehicle body side relative to the fabric sheet. According to this arrangement, the spacer rear body and the spacer front body may be attached to the fabric sheet prior to installing the airbag in the vehicle. The spacer is prevented from coming off the fabric sheet, thereby improving the workability.

According to yet another embodiment of the present invention, the structure for attaching a fabric sheet to a vehicle body may include a tacking member for tacking the spacer rear body to the vehicle body. The vehicle body may be formed with an engaging hole with which the tacking member is engaged. According to this embodiment of the present invention, the spacer may be tacked to the vehicle body prior to attaching the fabric sheet to the vehicle body, thereby significantly improving the efficiency of the process for attaching the fabric sheet to the vehicle body.

The structure for attaching a fabric sheet to a vehicle body of the present invention is extremely suitable for attaching an airbag for protection of a vehicle occupant's head to a vehicle body.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Hereinafter, embodiments of the present invention will be described with reference to the attached drawings.

Figure 1:
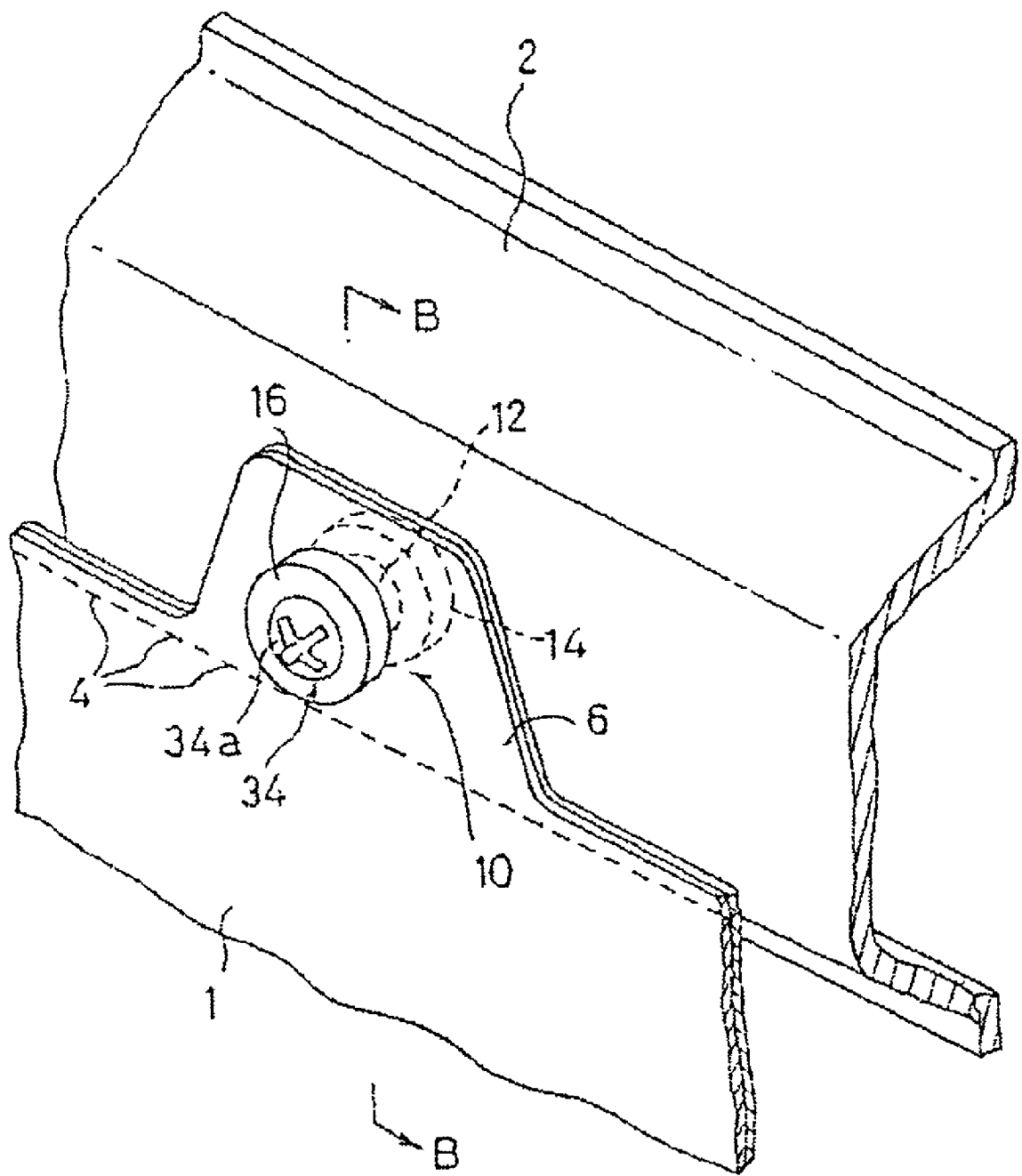
FIG. 1 is a perspective view showing a structure for attaching a fabric sheet to a vehicle body according to an embodiment of the present invention.
Figure 2A:
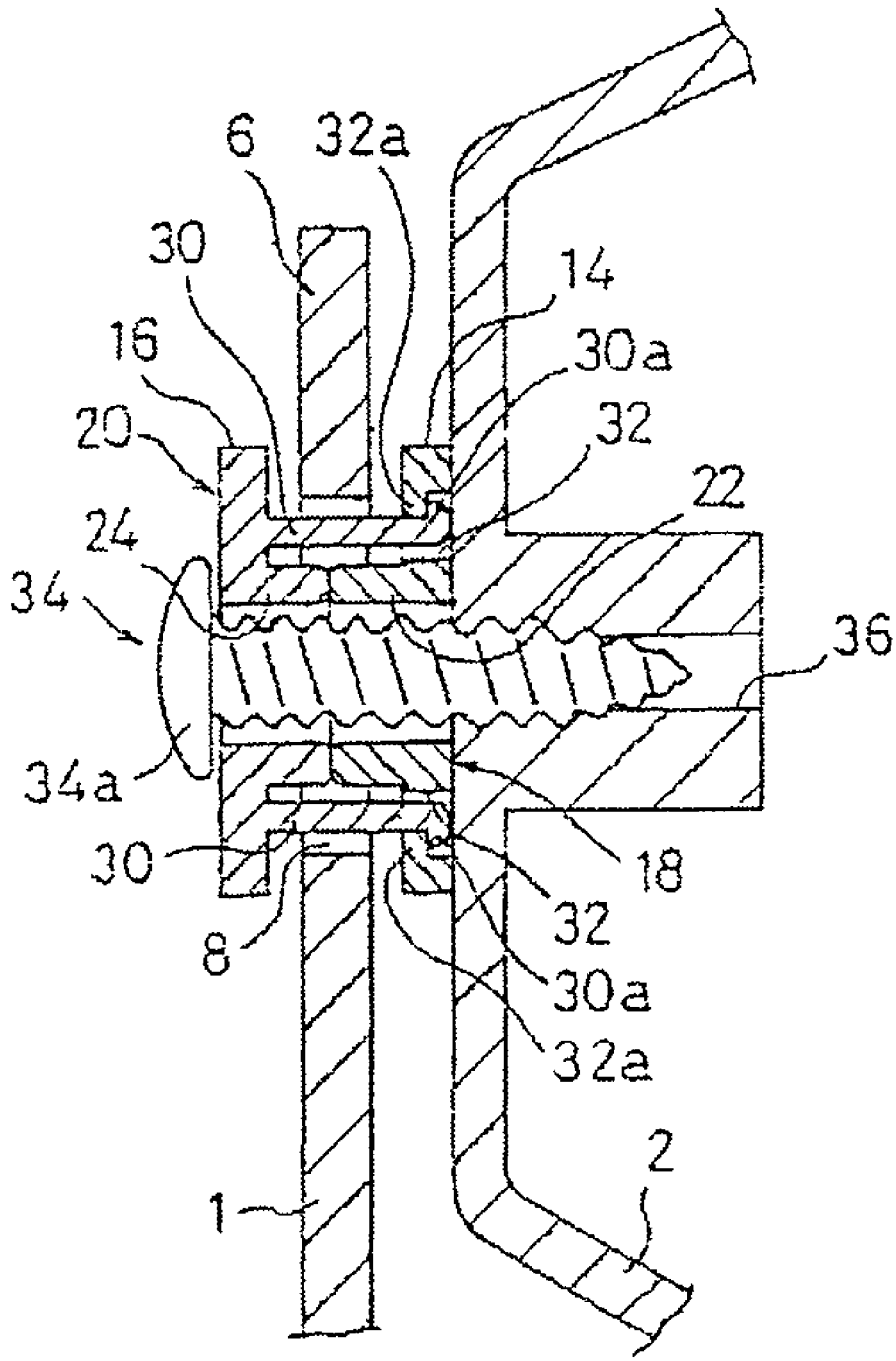
FIG. 2(a) is a sectional view taken along a line 11-11 of FIG. 1.
Figure 2B:
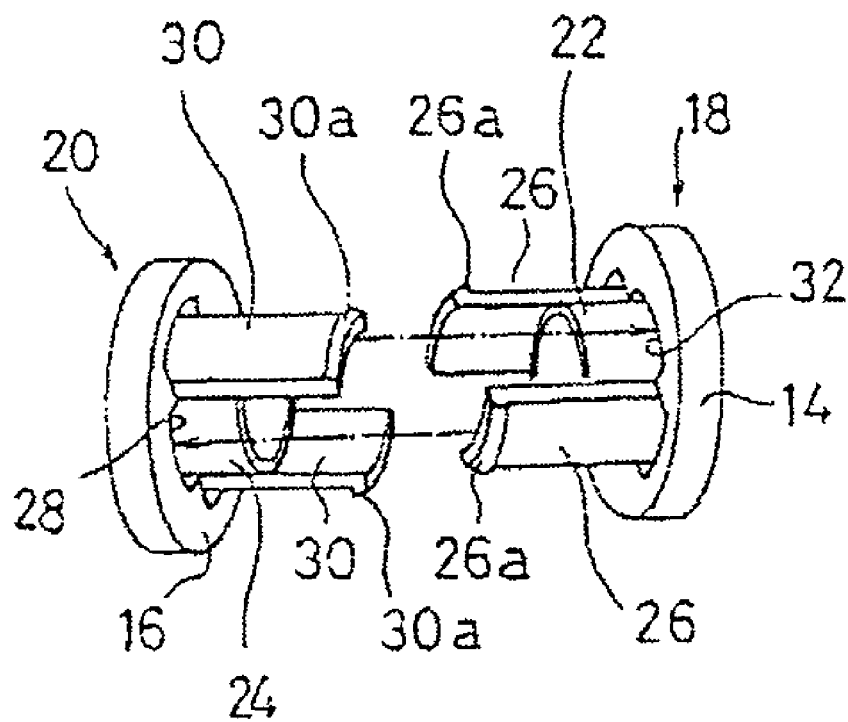
FIG. 2(b) is an exploded perspective view of a spacer.
Figure 3:
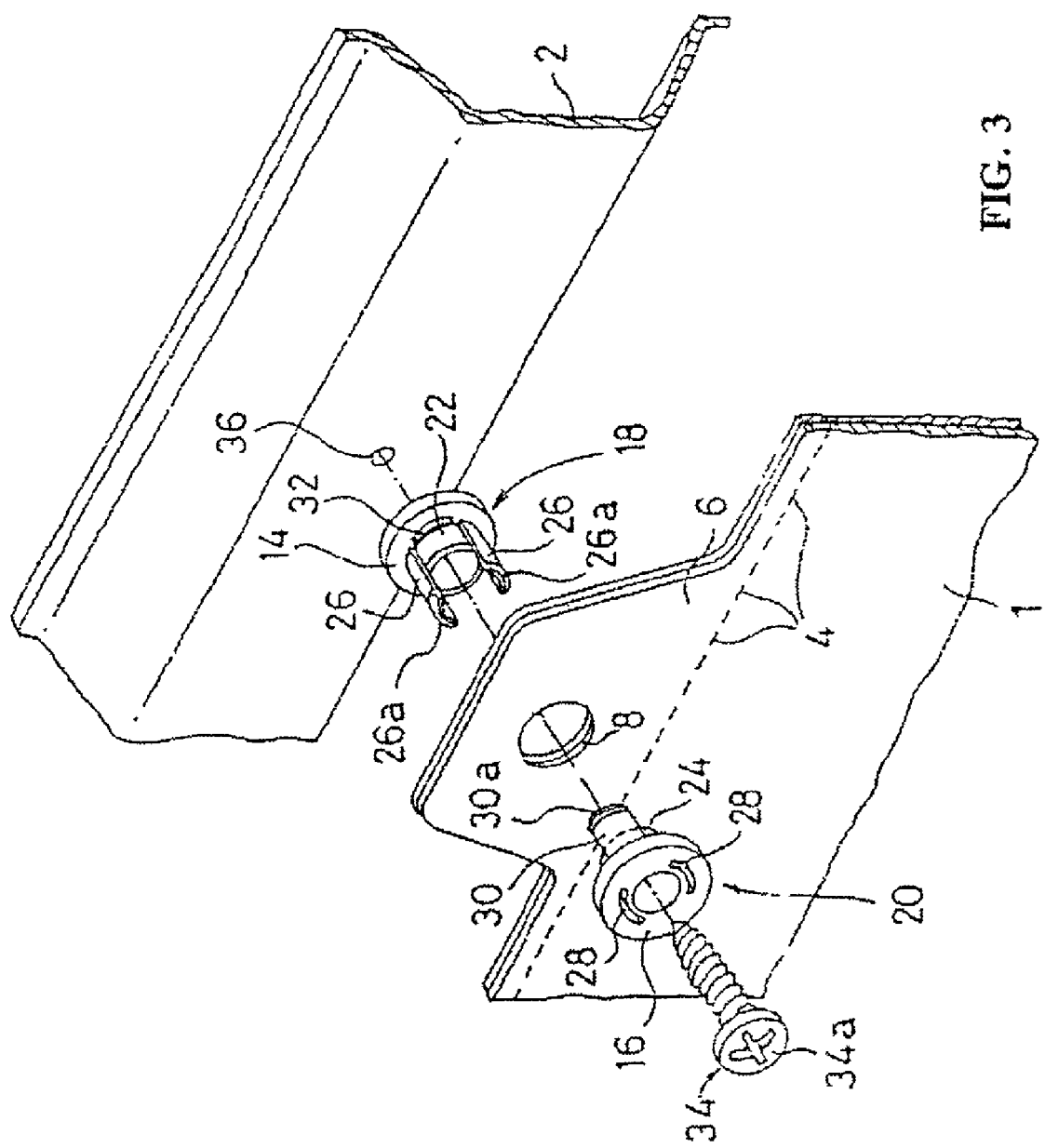
FIG. 3 is an exploded perspective view showing the structure for attaching the fabric sheet to a vehicle body.

According to an embodiment of the present invention shown in FIGS. 1-3, an airbag 1 for protection of a vehicle occupant's head is attached to a roof side rail 2 of a vehicle body of an automobile. The airbag 1 comprises two fabric sheets of which peripheral edge portions are joined together by sewing yarn 4 or adhesive agent so as to form an envelope shape. The airbag 1 is provided along the upper edge with tabs 6 upwardly projecting. Each tab 6 has a hole 8 formed therein for mounting the airbag 1 to the roof side rail 2.

A generally cylindrical spacer 10 is fitted to each hole 8. The spacer 10 comprises a cylindrical portion 12 into which a threaded fastener such as a bolt is inserted, and a pair of flanges 14, 16 radially overhanging from both axial ends of the cylindrical portion 12. The flanges 14,16 have an outer diameter which is larger than the inner diameter of the hole 8. The cylindrical portion 12 is inserted into the hole 8 such that the flanges 14, 16 are positioned behind (the side facing the roof side rail 2) and in front (the opposite side) of the tab 6 to face the peripheries around the hole 8 of the tab 6. As a result, the spacer 10 is held and prevented from coming off the hole 8.

The spacer 10 is designed such that the distance between the flanges 14 and 16, that is, the axial length of the cylindrical portion 12 is larger than the thickness of the tab 6 and the outer size of the cylindrical portion 12 (including hooks 26, 30 described later) is smaller than the inner diameter of the hole 8. The specific dimensions of the spacer 10 are selected so that the tab 6 may be prevented from being caught between the flanges 14 and 16 and the spacer 10 slips or rotates within the hole 8 even when rotational torque is applied to the spacer 10 from the threaded fastener during the screwing of the threaded fastener. As a result, the tab 6 is prevented from being twisted together with the spacer 10.

As shown in FIG. 2(b) and FIG. 3, the spacer 10 may include a spacer half 18 as a spacer rear body to be inserted into the hole 8 from behind the tab 6 and a spacer half 20 as a spacer front body to be inserted into the hole 8 from the front of the tab 6. The spacer halves 18, 20 have cylindrical portions 22, 24, respectively. Each of the cylindrical portions 22, 24 composes one half side (or the other half side) extending from one end of the cylindrical portion 12 to the middle of the same in the axial direction thereof. The aforementioned flanges 14, 16 are disposed on one ends of the cylindrical portions 22, 24, respectively.

Disposed on the flange 14 near the position connected to the cylindrical portion 22 are a pair of hooks 26 which are arranged on opposite sides about the cylindrical portion 22 to face to each other in the diametrical direction. The hooks 26 extend along the axial direction of the cylindrical portion 22 and project beyond the other end of the cylindrical portion 22. The hooks 26 are provided with pawls 26a formed at the free ends thereof. The pawls 26a project in directions apart from each other. A pair of receiving holes 28 for engaging the hooks 26 are formed in the flange 16. The receiving holes 28 are formed at positions facing to each other in the diametrical direction with the cylindrical portion 22 therebetween.

Disposed on the flange 16 near the position connected to the cylindrical portion 24 are a pair of hooks 30 (similar to the hooks 26 on flange 14). The hooks 30 are arranged on opposite sides about the cylindrical portion 24 to face to each other in a direction perpendicular to the direction in which the receiving holes 28 face to each other. The hooks 30 extend along the axial direction of the cylindrical portion 24 to project beyond the other end (the end of the cylindrical portion 24 opposite to the end where the flange 16 is formed) of the cylindrical portion 24. The hooks 30 are provided with pawls 30a which are formed at the free ends thereof to project in directions apart from each other. A pair of receiving holes 32 for engaging the hooks 30 are formed in the flange 14 near the position connected to the cylindrical portion 22. The receiving holes 32 are aligned in a direction perpendicular to the direction in which the hooks 26 face to each other and arranged on opposite sides about the cylindrical portion 22.

To fit the spacer 10 in the hole 8 of the tab 6, the cylindrical portions 22, 24 of the spacer halves 18, 20 are inserted into the hole 8 from behind and front of the tab 6, respectively, so that the other ends of the cylindrical portions 22, 24 are butted against each other. Accordingly, the hooks 26, 30 are engaged with the receiving holes 28, 32, respectively, thereby connecting the cylindrical portions 22, 24 coaxially together as shown in FIG. 2(a).

In the receiving holes 28, 32, step portions are formed for catching the corresponding pawls 26a, 30a on the ends of the hooks 26, 30 when the hooks 26, 30 are fully inserted (reference numeral 32a designates the step portions for catching the pawls 30a). The step portions for catching the pawls 26a are formed in the same configuration as the step portions 32a, but are not illustrated. The pawls 26a, 30a are caught by the step portions so that the hooks 26, 30 are engaged with the receiving holes 28, 32 and the spacer halves 18, 20 are thus connected to each other and prevented from separating from each other.

The outer size of the cylindrical portion 12 is the maximum diameter of portions of the spacer 10 to be inserted into the hole 8 including the hooks 26, 30.

The tab 6 of the airbag 1 is fixed to the roof side rail 2 by a bolt 34 using the spacer 10. That is, the bolt 34 is inserted in the cylindrical portion 12 of the spacer 10 fitted in the hole 8 of the tab 6. By screwing the bolt 34 into a bolt hole 36 formed in the roof side rail 2, the tab 6 is fixed to the roof side rail 2.

During fixing the tab 6 to the roof side rail 2, the flange 14 of the spacer 10 comes in contact with the roof side rail 2 and the flange 16 receives the head 34a of the bolt 34 (the enlarged portion of the bolt 34 positioned at the rear end in the screwing direction). Therefore, the head 34a of the bolt 34 never touches the tab 6 of the airbag 1 so that the tab 6 is never twists together with the bolt 34 when the bolt 34 is screwed into the bolt hole 36. When rotational torque is applied to the spacer 10 due to the screwing of the bolt 34, the spacer 10 slips within the hole 8 so as not to transmit the torque to the tab 6. Therefore, the tab 6 is not twisted.

Figure 4A:
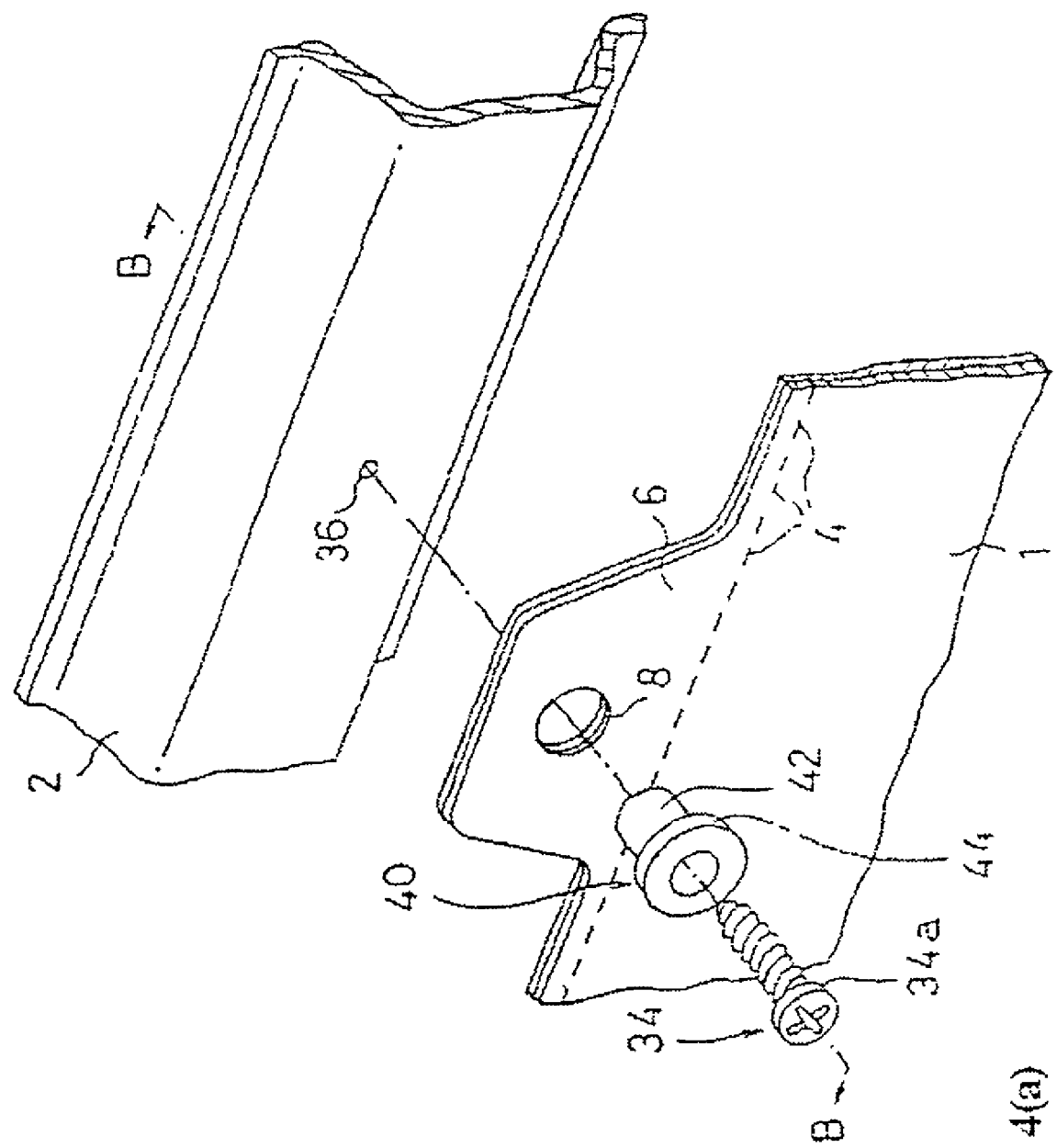
FIG. 4(a) is an exploded perspective view showing a structure for attaching a fabric sheet to a vehicle body according to another embodiment of the present invention.
Figure 4B:
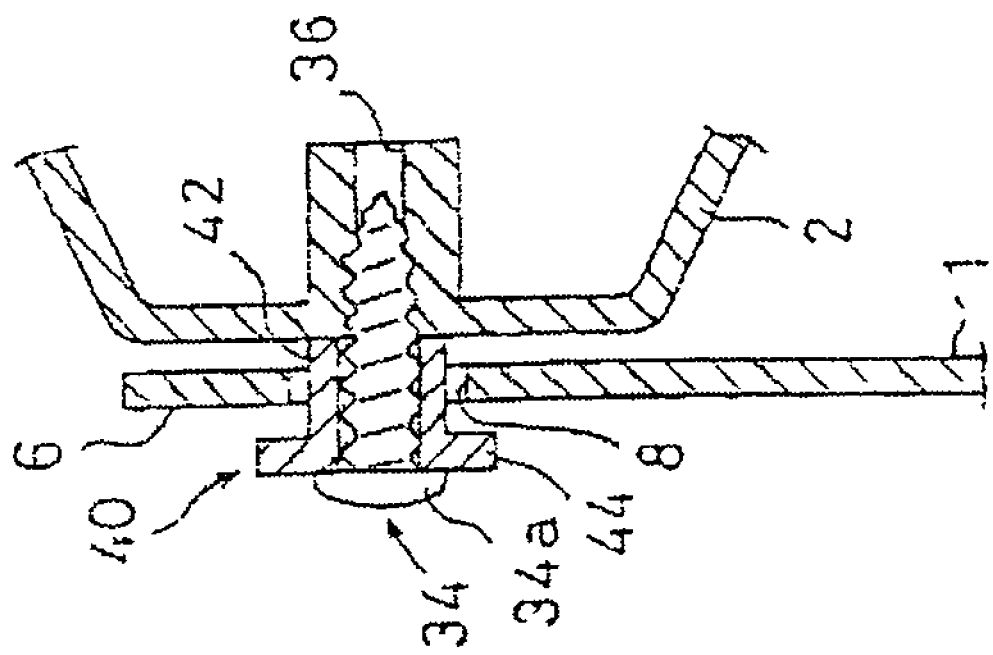
FIG. 4(b) is a sectional view taken along a line B-B of FIG. 4(a).

FIGS. 4(a) and 4(b) show a structure for attaching a fabric sheet to a vehicle body according to another embodiment of the present invention. In FIGS. 4(a), 4(b), the same numerals as used in FIGS. 1-3 designate similar or corresponding parts.

In this embodiment, a tab 6 of an airbag 1 is fixed to a roof side rail 2 by a bolt 34 via a spacer 40 which is generally cylindrical and is inserted in a hole 8. The spacer 40 has a cylindrical portion 42 into which the bolt 34 is inserted and a flange 44 formed on one axial end of the cylindrical portion 42 to receive a head 34a of the bolt 34. The axial length of the cylindrical portion 42 is larger than the thickness of the tab 6 and the outer diameter of the flange 44 is larger than the inner diameter of the hole 8. The outer size of the cylindrical portion 42 is smaller than the inner diameter of the hole 8.

In order to fix the tab 6 to the roof side rail 2 using the spacer 40, the other axial end portion (the side of the cylindrical portion 42 opposite to the one end side where the flange 44 is formed) of the cylindrical portion 42 is inserted into the hole 8 from the front of the tab 6 and the bolt 34 is then inserted into the cylindrical portion 42 and screwed into a bolt hole 36 formed in the roof side rail 2.

During this process, the other end of the cylindrical portion 42 comes in contact with the roof side rail 2 and the flange 44 receives the head 34*a* of the bolt 34. Therefore, the head 34*a* of the bolt 34 never touches the tab 6 of the airbag 1 so that the tab 6 is never twists together with the bolt 34 when the bolt 34 is screwed into the bolt hole 36. During this process, even when rotational torque is applied to the spacer 40 due to the screwing of the bolt 34, the spacer 40 slips within the hole 8 because the outer size of the cylindrical portion 42 is sufficiently small in comparison to the inner diameter of the hole 8 so as not to transmit the torque to the tab 6. Therefore, the tab 6 is not twisted.

According to this embodiment of the present invention, during the process for mounting the airbag 1 to the roof side rail 2, the spacer 40 may be inserted into the hole 8 in the same process of screwing the bolt 34 so that the bolt 34 is inserted in the cylindrical portion 42 and screwed into the bolt hole 36 of the roof side rail 2. Alternatively, the spacer 40 may be fitted in the hole 8 prior to the process of screwing of the bolt 34. In the case that the spacer 40 is fitted in the hole 8 prior to installing the bolt 34, it is preferable to include a mechanism for preventing the spacer 40 from coming off the hole 8 until the bolt 34 is fully screwed into the bolt hole 36.

According to an embodiment of the present invention, the mechanism for preventing the spacer 40 from coming off the hole 8 includes a toothed washer having a diameter larger than the inner diameter of the hole 8 temporarily attached to the end of the bolt 34, thereby preventing the spacer 40 from coming off the hole 8. According to this embodiment, in addition to the effect of preventing the spacer 40 from coming off the hole 8, the efficiency of the process of attaching the fabric sheet to the vehicle body is significantly improved because the bolt 34 may be inserted in the cylindrical portion 42 prior to attaching the fabric sheet to the vehicle body. In this case, the tab 6 may be fixed to the roof side rail 2 by simply screwing the bolt 34 into the bolt hole of the roof side rail 2 after positioning the tab 6 in place.

Figure 7C:
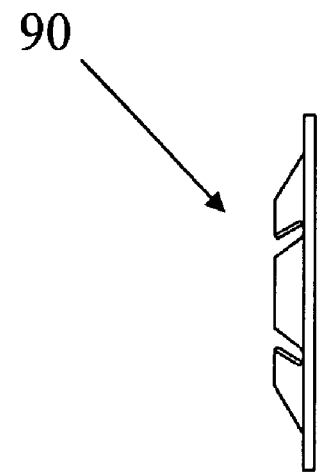
FIG. 7(c) is a side view of the toothed washer.
Figure 7B:
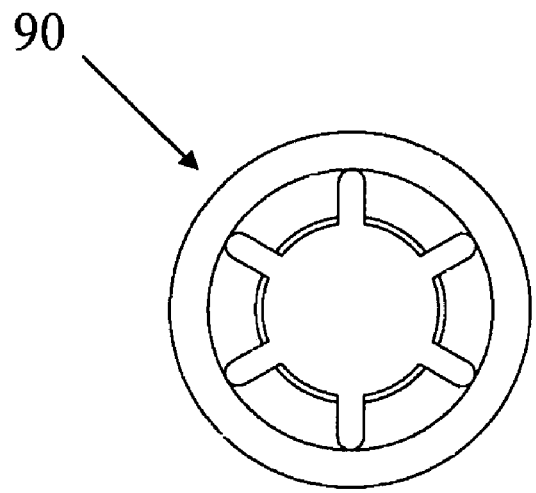
FIG. 7(b) is a top view of the toothed washer.
Figure 7A:
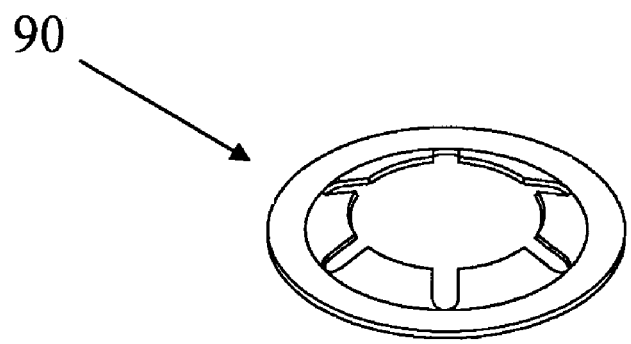
FIG. 7(a) is a perspective view of a toothed washer, according to an embodiment.

FIG. 7(*a*) shows a perspective view of a toothed washer, according to an embodiment. FIG. 7(*b*) shows a top view of the toothed washer, while FIG. 7(*c*) shows a side view of the toothed washer.

FIGS. 5(*a*) and 5(*b*) show a structure for attaching a fabric sheet to a vehicle body according to further another embodiment of the present invention. In FIGS. 5(*a*), 5(*b*), the same numerals as used in FIGS. 1-3 designate similar or corresponding parts.

As shown in FIG. 5(*a*), a tab 6 of an airbag 1 is fixed to a roof side rail 2 by a bolt 34 via a spacer 50 which is fitted in a hole 8. The spacer 50 is provided with a tacking projection 52 as a stopper for temporarily fixing the tab 6 to the roof side rail 2. The roof side rail 2 is formed with an engaging hole 54 for engaging the tacking projection 52.

The spacer 50 comprises a spacer half 56 as a spacer rear body and a spacer half 58 as a spacer front body. The spacer halves 56, 58 have generally rectangular plates 60, 62 to be disposed behind and in front of the tab 6. The cylindrical portions 64, 66 penetrate the plates 60, 62.

Each cylindrical portion 64, 66 is disposed on one half side of each plate 60, 62, assuming that the plate is divided in two in the longitudinal direction thereof. One end of the cylindrical portions 64, 66 is flush with surfaces of the plates 60, 62 on the side opposite to the side facing to the tab 6 and the other end of the cylindrical portions 64, 66 project from the surfaces of the plates 60, 62 on the side facing to the tab 6. The axial direction of each cylindrical portion 64, 66 is normal to the surface of each plate 60, 62.

The plate 60 is provided with a pair of hooks 68. The hooks 68 extend from positions near the proximal end of the cylindrical portion 64 along the axial direction thereof to project more than the other end of the cylindrical portion 64 and are arranged on opposite sides about the cylindrical portion 64 to face to each other in the diametrical direction. The hooks 68 are provided with pawls 68*a* formed at the free ends thereof, respectively. The pawls 68*a* project in directions apart from each other. Formed in the plate 62 are a pair of receiving holes 70 for engaging the hooks 68. The receiving holes 70 are formed at positions near the proximal end of the cylindrical port 66 so that they are aligned in the diametrical direction and arranged on opposite sides about the cylindrical portion 66.

The plate 62 is provided with a pair of hooks 72, which are similar to the hooks 68, projecting from positions near the proximal end of the cylindrical portion 66. The hooks 72 are arranged on opposite sides about the cylindrical portion 66 to face to each other in a direction perpendicular to the direction in which the receiving holes 70 face to each other. The hooks 72 extend along the axial direction of the cylindrical portion 66 to project more than the other end of the cylindrical portion 66. The hooks 72 are provided at the free ends with pawls 72*a* projecting in directions apart from each other. Formed in the plate 60 are a pair of receiving holes 74 for engaging the hooks 72. The receiving holes 74 are formed near the proximal end of the cylindrical port 64 so that they are aligned in a direction perpendicular to the direction in which the hooks 68 face to each other and arranged on opposite sides about the cylindrical portion 64.

To fit the spacer 50 in the hole 8 of the tab 6, the cylindrical portions 64, 66 of the spacer halves 56, 58 are inserted into the hole 8 from behind and front of the tab 6, respectively, so that the other ends of the cylindrical portions 64, 66 are butted against each other. Accordingly, the hooks 68, 72 are engaged with the corresponding receiving holes 70, 74, whereby the cylindrical portions 64, 66 are coaxially connected together.

In the receiving holes 70, 74, step portions (not shown) are formed for catching the corresponding pawls 68*a*, 72*a* on the ends of the hooks 68, 72 when the hooks 68, 72 are fully inserted. The pawls 68*a*, 72*a* are caught by the step portions so that the hooks 68, 72 are engaged with the receiving holes 70, 74 and the spacer halves 56, 58 are thus connected to each other and prevented from separating from each other.

When the spacer halves 56, 58 are connected to each other, the outer size of the cylindrical portions 64, 66 including the hooks 68, 72 fitted in the hole 8 is smaller than the inner diameter of the hole 8, and the distance between the plates 60 and 62, i.e. the axial length of the cylindrical portions 64 and 66 is larger than the thickness of the tab 6.

The aforementioned tacking projection 52 is formed on the plate 60 to be disposed behind the tab 6 to project from the surface of the plate 60 on the side facing toward the roof side rail 2. According to this embodiment of the present invention, the tacking projection 52 includes a pair of semi-cylindrical hooks 76 arranged adjacent to each other such that curved faces thereof are directed in directions apart from each other. The hooks 76 may elastically deform in directions closing to each other. Each hook 76 is provided with an enlarged portion 76a at the middle in the longitudinal direction thereof and an end portion which is tapered from the enlarged portion 76a toward the end.

For fixing the tab 6 of the airbag 1 to the roof side rail 2, the tacking projection 52 is first inserted into the engaging hole 54 of the roof side rail 2. During this, the hooks 76 of the tacking projection 52 deform in the directions closing to each other to allow the enlarged portions 76a to pass through the engaging hole 54 according to the sliding of the tapered surfaces of the end portions along the periphery of the engaging hole 54. As the enlarged portions 76a pass through the engaging hole 54, the hooks 76 are spaced apart from each other because of their restoring forces to elastically return to their original positions. Therefore, the enlarged portions 76a are caught by the peripheral edge of the engaging hole 54 so that the tacking projection 52 is engages the engaging hole 54, thereby temporarily fixing the tab 6 to the roof side rail 2 via the spacer 50. Next, the bolt 34 is inserted into the cylindrical portions 66, 64 and screwed into the bolt hole 36, thereby fixing the tab 6.

According to the structure employing the aforementioned spacer 50 for attaching a fabric sheet to a vehicle body, the tab 6 may be temporarily fixed prior to the screwing process, for fixing the tab 6 to the roof side rail 2, thereby significantly improving the efficiency of the process of attaching the fabric sheet to the vehicle body.

Figure 5A:
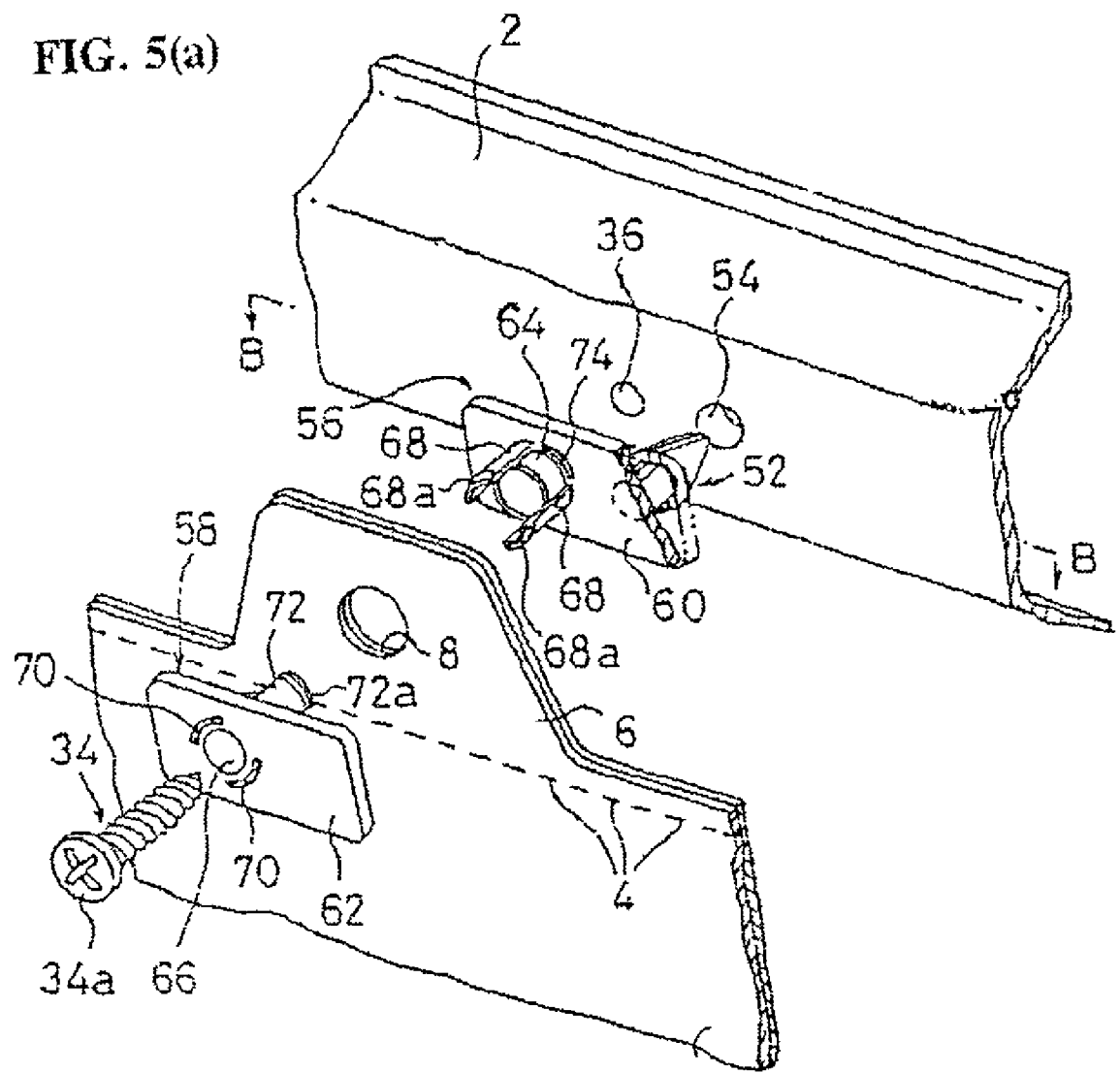
FIG. 5(a) is an exploded perspective view showing a structure for attaching a fabric sheet to a vehicle body according to further another embodiment of the present invention.
Figure 5B:
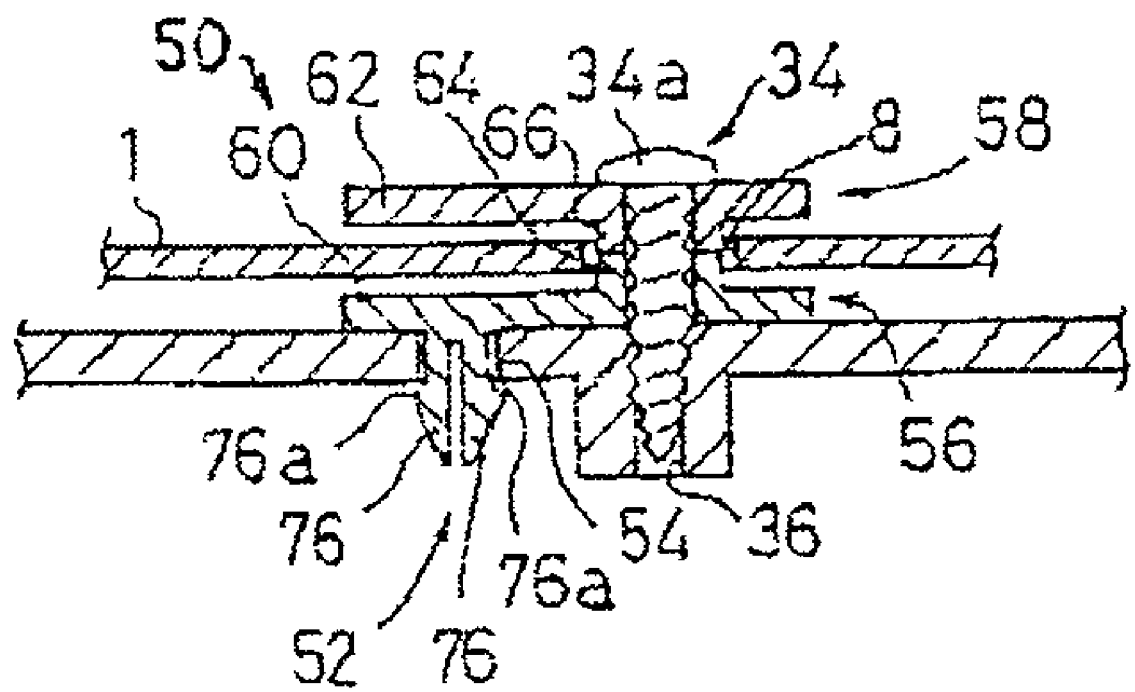
FIG. 5(b) is a sectional view taken along a line B-B of FIG. 5(a).

It should be noted that another connecting structure may be employed for connecting the spacer rear body and the spacer front body, besides the illustrated connecting structure in the embodiment of FIGS. 5(a), 5(b) and the embodiment of FIGS. 1-3. In addition, the detailed structure of the spacer is not limited to the illustrated one. For example, the spacer may take the form of a spacer 50A shown in FIGS. 6(a), 6(b).

Figure 6A:
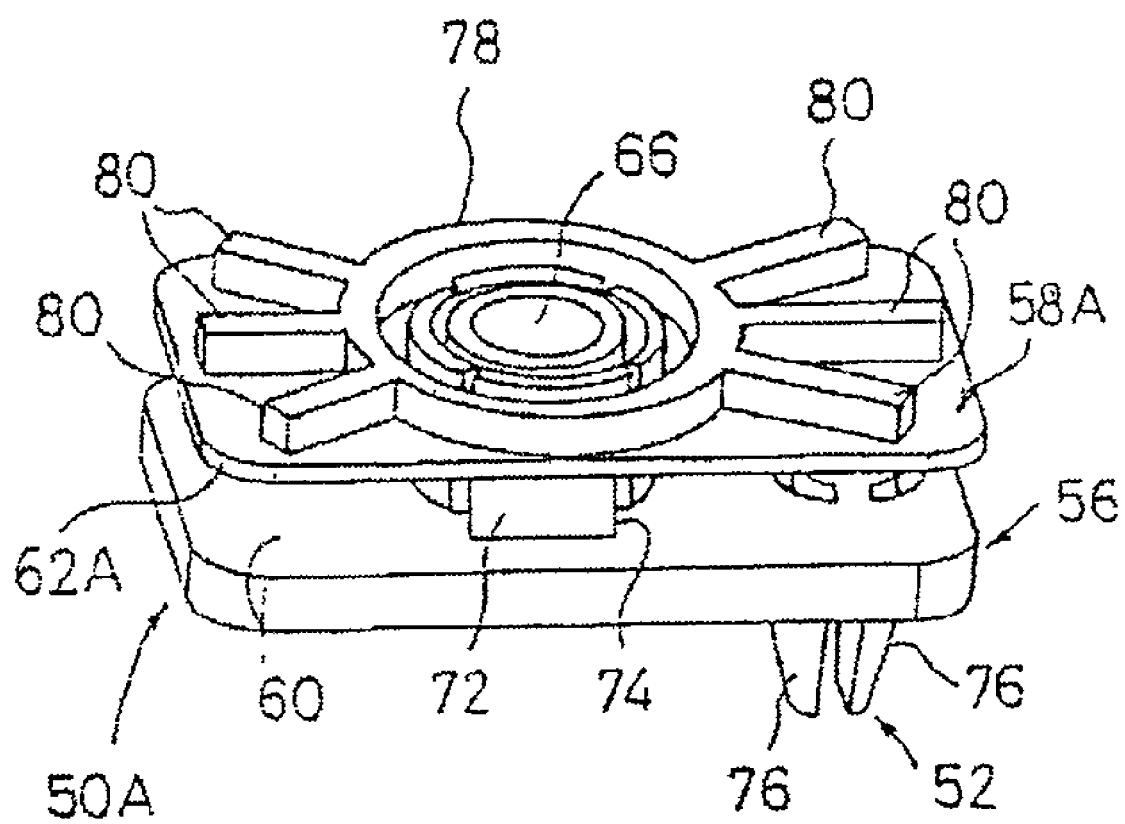
FIG. 6(a) is a front perspective view of the spacer according to another embodiment of the present invention.
Figure 6B:
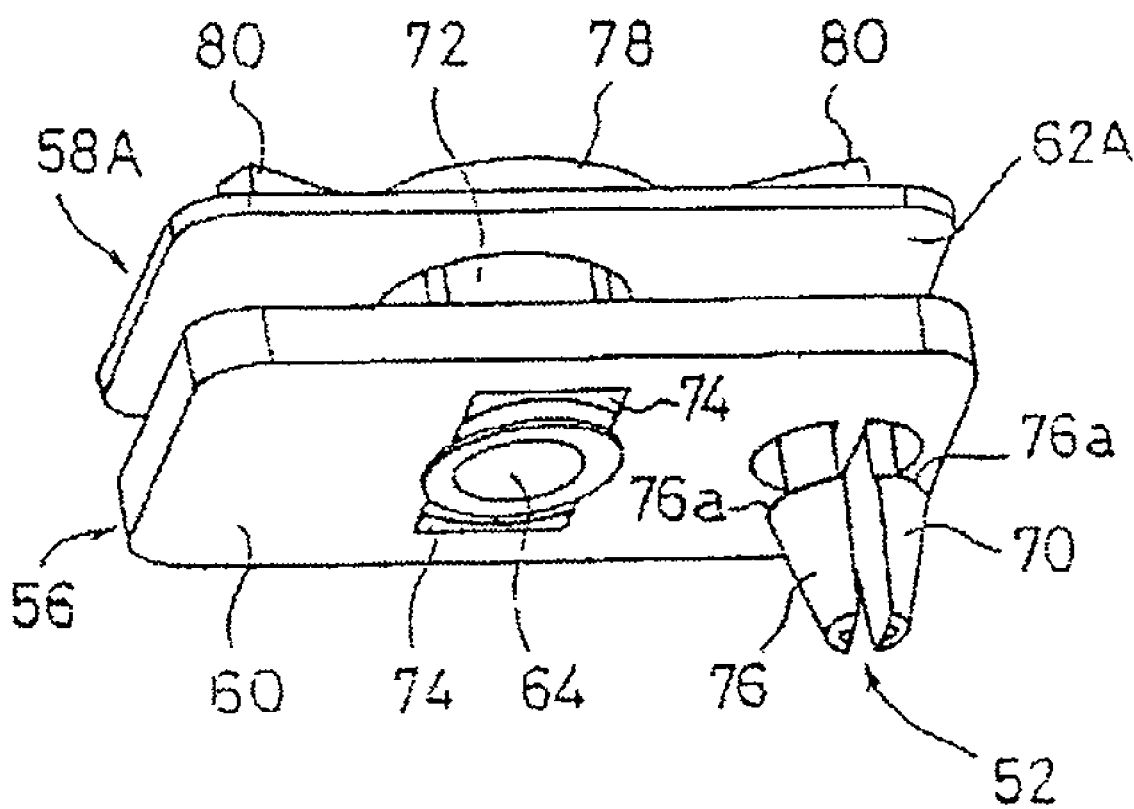
FIGS. 6(b) is a rear perspective view of the spacer of FIG. 6(a).

FIG. 6(a) is a perspective view of the spacer 50A according to an embodiment taken from the front side and FIG. 6(b) is a perspective view of the spacer 50A taken from behind.

The spacer 50A is similar to the aforementioned spacer 50 shown in FIGS. 5(a) and 5(b). The space 50A includes a spacer half 58A having a thinner plate 62A instead of the spacer half 58. The plate 62 is provided on its surface with ribs 78, 80 so as to have enough strength. The other structure of the spacer 50A is the same as that of the aforementioned spacer 50. In FIGS. 6(a), 6(b), the same numerals as used in FIGS. 5 (a), 5(b) designate the similar or corresponding parts.

As described above, in the structure for attaching a fabric sheet to a vehicle body of the present invention, a spacer is inserted in a hole of the fabric sheet and a threaded fastener is inserted in the spacer so that the threaded fastener is held in non-contact with the fabric sheet. Therefore, the fabric sheet is never twisted together with the rotation of the threaded fastener when the threaded fastener is screwed into the vehicle body, thereby attaching the fabric sheet to the vehicle body with extremely high precision.

In the structure for attaching a fabric sheet to a vehicle body of the present invention, a flange for receiving an enlarged portion of the threaded fastener is integrally formed with the cylindrical portion, thereby facilitating the operation of inserting the threaded fastener into the spacer and screwing the threaded fastener into the vehicle body.

Further, in the structure for attaching a fabric sheet to a vehicle body of the present invention, the spacer rear body and the spacer front body are attached to the fabric sheet prior to attaching the fabric sheet to the vehicle body, so that the spacer is prevented from coming off the fabric sheet during the attaching operation, thereby improving the workability.

Furthermore, in the structure for attaching a fabric sheet to a vehicle body of the present invention, a tacking member for tacking the spacer rear body to the vehicle body may be provided. As a result, the spacer may be tacked to the vehicle body prior to attaching the fabric sheet to the vehicle body, to thereby significantly improve the efficiency of the process for installing the airbag.

The structure for attaching a fabric sheet to a vehicle body of the present invention is extremely suitable for attaching an airbag for protection of a vehicle occupant's head to a vehicle body.

The priority application, Japanese Patent Application No. 2001-221676, filed Jul. 23, 2001, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag and a structure for attaching the airbag to a vehicle body, comprising:
    an airbag comprising a fabric sheet with a hole, wherein the fabric sheet is attached to the vehicle body by inserting a threaded fastener through the hole of the fabric sheet and screwing the fastener into a fastening hole formed in the vehicle body, and
    a spacer positioned in the hole of the fabric sheet, the spacer having a cylindrical portion inserted in the hole of the fabric sheet, the diameter of the cylindrical portion being smaller than the inner diameter of the hole of the fabric sheet,
    wherein the spacer comprises a plurality of hooks, wherein the hooks are arranged about an outer circumference of the cylindrical portion, wherein the cylindrical portion extends between the hooks in a longitudinal direction of the spacer,
    wherein the threaded fastener is inserted into the cylindrical portion,
    wherein an end of the spacer is in contact with the vehicle body and another end of the spacer is provided with a flange having a diameter larger than the inner diameter of the hole of the fabric sheet,
    wherein the spacer is configured to rotate within the hole of the fabric sheet,
    wherein the spacer comprises a spacer rear body and a spacer front body to be connected with the spacer rear body, wherein at least one of the spacer front body and the spacer rear body include a pair of said hooks, each hook being provided with a pawl.

2. The airbag and structure for attaching of claim 1, wherein the flange is integrally formed with the cylindrical portion.

3. The airbag and structure for attaching of claim 1, wherein either the spacer front body or spacer rear body includes the flange, and the other of the spacer front body and spacer rear body includes an enlarged portion larger than the hole of the fabric sheet, the enlarged portion being located between the vehicle body and the fabric sheet.

4. The airbag and structure for attaching of claim 1, wherein at least one of the spacer rear body and the spacer front body include said cylindrical portion inserted in the hole of the fabric sheet, wherein the spacer front body includes a said flange having a diameter larger than the inner diameter of the hole of the fabric sheet, wherein the spacer rear body includes an enlarged portion larger than the hole of the fabric sheet, wherein the enlarged portion is located between the vehicle body and the fabric sheet, wherein the spacer includes a tacking member for tacking the spacer to the vehicle body so that the tacking member engages with an engaging hole in the vehicle body, and the spacer is configured to rotate within the hole of the sheet prior to tacking the spacer to the vehicle body with the tacking member.

5. The airbag and structure for attaching of claim 1, wherein the hole in the fabric sheet is located in an edge portion of an airbag that is intended to protect a vehicle occupant's head.

6. The airbag and structure for attaching of claim 1, wherein both of the spacer front body and the spacer rear body include a pair of said hooks, wherein the hooks are provided with a pawl, wherein both of the spacer front body and the spacer rear body include receiving holes that are configured to engage with the pair of hooks of the other of the spacer front body and the spacer rear body.

7. The airbag and structure for attaching of claim 6, wherein both of the spacer front body and the spacer rear body comprise a flange, wherein the receiving holes are formed in the flanges.

8. The airbag and structure for attaching of claim 6, wherein the receiving holes comprise step portions formed for catching the pawls when the hooks are inserted into the receiving holes.

9. The airbag and structure for attaching of claim 1, wherein the spacer is configured to be separate from the threaded fastener so that the spacer and threaded fastener form separate pieces.

10. A spacer for attaching an airbag including a fabric sheet to a vehicle body, comprising:

a spacer, wherein the spacer is adapted to be positioned in a hole of the fabric sheet, the spacer including a cylindrical portion inserted in the hole of the fabric sheet, the diameter of the cylindrical portion being smaller than the inner diameter of the hole of the fabric sheet, wherein the spacer includes a plurality of hooks, wherein the hooks are arranged about an outer circumference of the cylindrical portion, wherein the cylindrical portion extends between the hooks in a longitudinal direction of the spacer, wherein the fabric sheet is attached to the vehicle body by inserting a threaded fastener through a hole of the fabric sheet and screwing the fastener into a fastening hole formed in the vehicle body, wherein the threaded fastener is inserted into the cylindrical portion, wherein an end of the spacer is in contact with the vehicle body and another end of the spacer is provided with a flange having a diameter larger than the inner diameter of the hole of the fabric sheet, wherein the spacer is configured to rotate within the hole of the fabric sheet, wherein the spacer comprises a spacer rear body and a spacer front body to be connected with the spacer rear body, wherein at least one of the spacer front body and the spacer rear body include a pair of said hooks, each hook being provided with a pawl.

11. The spacer of claim 10, wherein both of the spacer front body and the spacer rear body include a pair of said hooks, wherein the hooks are provided with a pawl, wherein both of the spacer front body and the spacer rear body include receiving holes that are configured to engage with the pair of hooks of the other of the spacer front body and the spacer rear body.

12. The spacer of claim 11, wherein both of the spacer front body and the spacer rear body comprise a flange, wherein the receiving holes are formed in the flanges.

13. The spacer of claim 11, wherein the receiving holes comprise step portions formed for catching the pawls when the hooks are inserted into the receiving holes.

* * * * *